United States Patent
Kjær Olsen

(10) Patent No.: US 10,447,883 B2
(45) Date of Patent: Oct. 15, 2019

(54) OPTICAL FLATBED SCANNER WITH DOCUMENT PRESSER MEMBER

(71) Applicant: Global Scanning Denmark A/S, Allerød (DK)

(72) Inventor: Bo Kjær Olsen, Hillerød (DK)

(73) Assignee: Global Scanning Denmark A/S, Allerød (DK)

( * ) Notice: Subject to any disclaimer, the term of this patent is extended or adjusted under 35 U.S.C. 154(b) by 0 days.

(21) Appl. No.: 15/908,216

(22) Filed: Feb. 28, 2018

(65) Prior Publication Data
US 2018/0249033 A1   Aug. 30, 2018

(30) Foreign Application Priority Data

Feb. 28, 2017  (EP) ..................................... 17158478
Feb. 28, 2017  (EP) ..................................... 17158479

(51) Int. Cl.
| | |
|---|---|
| H04N 1/10 | (2006.01) |
| H04N 1/024 | (2006.01) |
| H04N 1/00 | (2006.01) |
| H04N 1/04 | (2006.01) |

(52) U.S. Cl.
CPC ....... *H04N 1/1013* (2013.01); *H04N 1/00559* (2013.01); *H04N 1/02409* (2013.01); *H04N 1/04* (2013.01); *H04N 1/1061* (2013.01)

(58) Field of Classification Search
None
See application file for complete search history.

(56) References Cited

U.S. PATENT DOCUMENTS 5,578,813 A * 11/1996 Allen ..................... H04N 1/047
                                                            250/208.1
5,986,774 A * 11/1999 Han ................... H04N 1/02815
                                                              358/475

(Continued)

FOREIGN PATENT DOCUMENTS

EP        1677508 A1      7/2006

OTHER PUBLICATIONS

Extended European Search Report for Application No. 18158872.4 dated Mar. 23, 2018 in 7 pages.

*Primary Examiner* — Paul F Payer
(74) *Attorney, Agent, or Firm* — Knobbe, Martens, Olson & Bear, LLP

(57) ABSTRACT

A flatbed scanner includes a flatbed document scanner body accommodating a transparent plate for supporting a physical document and a document cover, which includes a sheet member with an expanse covering at least a substantial area of the transparent plate. The rectangular document cover has an underside and a movable carriage extending across the rectangular transparent plate in a transverse direction. The movable carriage carries a camera or an optical system for a camera. The sheet member of the rectangular document cover is magnetic or carries one or more magnetic plates, so as to be magnetically attracted towards the movable carriage and exert a pressing force on the physical document when supported on the rectangular transparent plate. A compressing force is thereby applied to an original document resting at an area at which the movable carriage currently is located while scanning a line of the original document.

20 Claims, 7 Drawing Sheets

(56) References Cited

U.S. PATENT DOCUMENTS

| | | | |
|---|---|---|---|
| 7,342,692 B2 * | 3/2008 | Chang | H04N 1/031 250/208.1 |
| 8,035,869 B2 | 10/2011 | Osakabe | |
| 2007/0291330 A1 | 12/2007 | Spears | |
| 2009/0073510 A1 | 3/2009 | Spears | |

* cited by examiner

OPTICAL FLATBED SCANNER WITH DOCUMENT PRESSER MEMBER

Conventional flatbed document scanners comprise a horizontally arranged transparent plate for supporting an original document which can be laid on and face towards the transparent plate. Below the transparent plate a longitudinal carriage extending across the full width of the transparent plate and carrying a movable line scanning camera or an optical system for a fixed line scanning camera moves in a direction at right angles to the orientation of the longitudinal carriage. While the longitudinal carriage, carrying the movable line scanning camera or the optical system, moves an electronic circuit acquires line image data from the line scanning camera to produce a digital image of the original. Thereby the document is scanned line-by-line. The document, which is a physical document, such as a sheet of paper, a book, a painting, may be denoted an original or an original document, whereas the digital image thereof may be denoted the reproduction or the reproduced document.

Flatbed document scanners are widely known e.g. in a form integrated with a photo-copier and a printer and has transparent plate with an expanse sufficiently wide that an A3 format document can be laid out on it.

To ensure that the document lays outstretched flat against the transparent plate and to avoid or at least reduce influx of ambient light, a top cover is arranged on top of the original document, often carried by a hinged lid with a handle. The top cover exerts a pressure on top and across the original document. The top cover may be in the form of a white coloured 2-3 mm thick PVC sheet, which is attached to an underside of the lid by means of hook-and-loop fasteners.

Conventionally, the line camera was predominantly a Charge Coupled Device, CCD, based camera, whereas more recently so-called Contact Image Sensor, CIS, based cameras are more often employed because they can be manufactured at lower cost. One reason is that CCD based cameras requires a relatively large optical and mechanical system, whereas CIS based cameras are highly integrated. However, CIS based line cameras have a much more shallow depth of focus, typically within less than a millimeter, compared to CCD based line cameras which have a wider depth of focus.

Thus, when an original document lifts off from the transparent plate due to e.g. binding, folds, undulations, or wriggles even by a fraction of millimeter there is a risk that the original document is reproduced in a blurred way at least at portions of the original document. Such blurring, image degradation, is generally not acceptable—the original document is then reproduced with a lack of fidelity, readability and possibly with distortion of colour reproduction.

To circumvent such problems with the original document lifting off from the transparent plate, a user may press the lid or press directly on the original document to exert more pressure on the original document to thereby flatten out e.g. the folds. However, generally this doesn't give the desired result throughout the expanse of the original document.

CIS based line cameras have been implemented in flatbed document scanners, which covers original documents up to about A3 format—in a so-called A3 format flatbed scanner. However, for large format flatbed scanners such as A2, A1 and A0 format flatbed scanners using CIS based line cameras, there have been significant obstacles in achieving good results in terms of image quality of the reproduced document due to the shallow depth of focus. All other things being equal, a larger format requires a larger transparent plate. The shallow depth of focus then becomes a problem, because when the transparent plate is made wider, it will deflect downwards and to a varying degree across the width of the transparent plate exceeding the range of the (shallow) depth of focus. Configuring a large format flatbed scanner with a thicker transparent plate, adds more weight, cost and deflection due to the added weight—leaving problems of poor image quality unsolved.

RELATED PRIOR ART

U.S. Pat. No. 7,342,692 B2 describes a scanner carrier that provides a high-quality scanning operation. The scan carrier utilizes the repulsive forces brought about by the identical pole pieces of a pair of magnet or the pressure produced by liquid or gas to ensure a close contact between the scanning module of a contact image sense scanning module and a transparent document platform. Buffer plates are attached to an inner edge of a scanning surface in contact with the document platform. However this involves the problem that traces of dust or wear eventually becomes visible on the underside of the transparent document platform. This will eventually cause image artefacts in the scanned document. It should be noted that problems related to deflection of the document platform remains unsolved.

U.S. Pat. No. 8,035,869 describes a Contact Image Sensor, CIS, based flatbed document scanner with a lid, or document cover, covering, when closed, an original document to be scanned when placed on a transparent document platform. Such a transparent document platform is also known as a contact glass, glass plate or platen etc. A layered presser member is attached to the inner side of the document cover and includes throughout its expanse a sponge and a white plate. When in a closed position, the document cover exerts a pressing force on the sponge which in turn presses on the white plate which in turn presses on the on the original document when placed on the transparent document platform. Thus, when the document cover is closed, the presser member closely contacts the contact glass so as to hold the original document on the transparent document platform. In this state, an image reading unit moves along and below the transparent document platform to read the original document.

However, a problem with such a sponge-based presser member, often made from a foam material, is that it exerts a pressure which may vary significantly from one scanner to another and also over time due to e.g. aging, humidity and temperature. Therefore it is hard to control how much deflection the presser member will cause on the transparent document platform when pressing against the original document to be scanned. One explanation may be that the sponge, the white plate or the layered presser member as a whole has a large spring constant which causes large variations in pressure across the expanse of the presser member even for small variations in distance between the white plate and the original document.

Other types of flatbed document scanners dispenses with the sponge or foam material and uses instead only a white plastics plate e.g. suspended from a lid by helix springs or fabric patches of the hook-and-loop fastener type respectively glued to the lid and the white plastics plate.

However, both the sponge-based presser members and the white plastics plate presser members may, eventually, get a wavy shape—irrespective of their suspension—which introduces small variations in distance between the white plate and the original document and thus large variations in pressure across the expanse of the presser member. The small variations in distance between the white plate and the original document inherently involve the risk that the original document lifts off from the transparent document platform e.g. due to folds or undulations in the original document. Especially for scanner cameras with a shallow depth of focus, areas of the original document that lifts off from the transparent document platform are at risk of being reproduced in a blurred or otherwise degraded manner.

Existing presser members appear to be suitable for Charge Couple Device, CCD, based scanner cameras—but much less so for Contact Image Sensor, CIS, based scanner cameras. Thus, especially for scanners with a camera with a shallow depth of focus, problems related to poor image quality caused by a lack of means which maintains a fixed distance, within a focus depth, between the scanner camera and the original document throughout its expanse remain unsolved in the prior art.

SUMMARY

There is provided a flatbed scanner comprising:
- a scanner body accommodating a transparent plate for supporting a physical document;
- a document cover comprising a sheet member;
- a movable carriage extending across the transparent plate in a transverse direction and configured to move below the transparent plate in a longitudinal direction; wherein the movable carriage carries a camera with one or more line cameras oriented in the transverse direction; and
- a magnet system, attached to the movable carriage, and configured to magnetically attract the sheet member or the one or more magnetic plates towards the movable carriage and thereby exert a significant pressing force acting on the physical document when supported on the transparent plate;

wherein the carriage is upwardly supported at three points; and
wherein the sheet member is magnetic or carries one or more magnetic plates; and
wherein the magnet system comprises multiple magnets arranged next to the one or more line cameras and has a magnetic centre located inside a triangle drawn between the three points.

Thereby a compressing force is applied to an original document resting on the transparent plate at an area at which the movable carriage currently is located while scanning a line of the original document. The magnetically induced compressing force acts to flatten out wrinkles in a creased sheet without requiring excessive weight or rigid mechanical means acting downwards on the document. Excessive weight or rigid mechanical means acting downwards on the document causes significant deflection of the transparent plate especially for large format document scanners.

Further, the magnetic force between the magnet system and the magnetic sheet member or magnetic plates improves stability, such as mechanical stability, of the carriage. Mechanical stability of the carriage contributes to improved image scanning quality. The magnetic centre is the position of the magnetic centre of the multiple magnets. In case the multiple magnets are equally strong, the magnetic centre is at the geometric centre position of the positions of the magnets. The three points at which the carriage is upwardly supported may be located at wheels attached to the carriage and rolling against an underside of the transparent plate. In some embodiments the wheels run along a path, against an underside of the transparent plate, outside an imaging region.

The magnet system and the sheet member and/or the magnetic plates may be ferromagnetic. The magnet system may comprise one or more permanent magnets. The magnetic sheet member and/or the magnetic plates may be magnetisable, but not permanently magnetised. By magnetisable is understood that the magnetic sheet member and/or the magnetic plates are attracted by an externally applied magnetic field, and form internal, induced magnetic fields in the direction of the applied magnetic field. The most common metals used for permanent magnets are iron, nickel, cobalt and some alloys of rare earth metals e.g. neodymium. In other embodiments he magnetic sheet member and/or the magnetic plates are permanently magnetised.

The sheet member may have an underside coated with a white film or painted white. The sheet member is relatively thin to optimize uniaxial, vertical compression while minimizing horizontal tension. The sheet member may be a flexible sheet member. In some aspects the flexible sheet member may have regions, such as between metal plates carried on the flexible sheet, whereat the flexible sheet member can be bent at least if it is detached from the scanner. In some aspects, the flexible sheet member may be rolled into a roll at least if it is detached from the scanner.

The magnetic plates may be arranged with a small clearance between each other to allow movement of the sheet. The clearance may be in the range of 0.5 to 3 times the thickness of the plates.

Suspension of the document cover may be dispensed with. Suspension may however be selected as a key-hole type; mushroom type; knee-joint suspension, wires, chains etc.

In some embodiments the magnet system is a stationary magnet system which is inflexibly attached to the carriage. The stationary magnet system may be immovably attached to the carriage in one or both of a vertical direction and horizontal direction. The entire stationary magnet system may be immovably attached to the carriage. The stationary magnet system may however be attached to the carriage via an adjustment member, allowing the position of the magnet system to be adjusted.

In some embodiments the camera, arranged on the carriage, comprises a multiple line cameras; and wherein the magnet system is configured with a magnetic flux density which, in a plane parallel to the rectangular transparent plate, is concentrated at positions next to the multiple line cameras.

The magnet system may have magnetic pole faces arranged at positions next to the multiple line cameras. The pole faces or a portion thereof may be arranged substantially parallel to the transparent plate.

In some aspects the magnet system comprises magnetic pole pieces coupled with one or more magnets to shift concentration of magnetic field lines to selected positions next to the line cameras. Thereby one or more magnets may be arranged e.g. with its pole faces at right angles to the transparent plate, where pole pieces have faces or portions thereof arranged to be substantial parallel to the transparent plate. In this way it may be possible to concentrate magnetic flux density closer to the line cameras or optical sensor elements thereof.

The cross-section, through a plane parallel with the rectangular transparent plate, through which magnetic flux lines extends are not magnetically shielded e.g. by metal or semiconducting sensors.

In some aspects the magnet system comprises magnets with same pole types facing upwards. Thus, magnetic particles of the magnets, on a vertical line, have a unidirectional polarity.

In some embodiments the camera, arranged on the carriage, comprises a multiple line cameras; and wherein the magnet system comprises multiple magnets attached to the movable carriage at positions next to the multiple line cameras. The line camera may have a longitudinal, substantially rectangular shape.

In some embodiments the carriage comprises a lateral base member; wherein the magnet system comprises multiple magnets attached to the movable carriage on respective vertical stays or spacers extending from the lateral base member; and wherein the magnets are arranged with their poles facing upwards or downwards. Thereby the magnets may be moved closer to the transparent plate and thus the magnetic weight members to improve the magnetic coupling.

In some embodiments the camera, arranged on the carriage, comprises multiple line cameras oriented in the transverse direction and arranged along two parallel rows in a staggered configuration; and wherein the line cameras are of the contact image sensor type.

In some embodiments the magnetic plates have an expanse and position on the flexible contact sheet to collectively cover at least a substantial area of the rectangular transparent plate.

In some embodiments the magnetic plates are glued to the flexible contact sheet at a centre spot and are not glued to the flexible contact sheet at peripheral portions about the centre spot.

In some embodiments the magnetic plates are upwardly decoupled from any mechanically inflicted vertical pressure larger than their gravitational load. Typically flatbed scanners are configured with a lid carrying the document cover as an underside thereof. A function of the lid is to lift the document cover away, typically to an inclined position, such that the transparent plate is accessible for placing the original document thereon. A function of the document cover, and the lid, is to keep surrounding light out.

In some embodiments the document cover comprises upwardly facing coupling members distributed across an upper side of the document cover; and wherein the flatbed scanner comprises a lifting member hinged to the flatbed document scanner body and configured with: a support face abutting the flatbed document scanner body or a periphery portion of the rectangular transparent plate when in a closed position; and downwardly facing complementary coupling means engaged with the coupling means; wherein the coupling means and the complementary coupling members has a mutual vertical clearance such that the lifting mechanism brings the document cover away from the transparent plate when in an open position and overlays the document cover on the transparent plate without the lifting member exerting force on the document cover when in a closed position.

The coupling member and complementary coupling members providing clearance in the vertical direction may be selected from the group consisting of: knee-joint suspension, wire suspension, chain suspension, and key-hole/ mushroom suspension. When the lifting member is in the closed position, with its support face abutting the flatbed document scanner body or a periphery portion of the rectangular transparent plate, the document cover is upwardly moveable at least within a clearance.

In some embodiments the document cover comprises upwardly extending suspension members configured with a head on a stem; and wherein the flatbed scanner comprises a lifting member hinged to the scanner body and configured with holes for accepting the heads of the coupling members and allowing a movement of the stem, while retaining the head of the coupling member when an extreme position is reached.

In some embodiments the lifting member is configured with: at least one keyhole of a first type with a slot that has a width equal to the diameter of a complementary stem plus a first clearance; and at least one keyhole of a second type with a slot that has a width equal to the diameter of a complementary stem plus a second clearance and a resilient constriction for fixing the stem of a coupling member horizontally.

In some aspects, the lifting member is additionally configured with at least one keyhole of a third type with a slot that has a width equal to the diameter of a complementary stem plus a third clearance. The first clearance and the second clearance may be substantially equal and be configured to fit the stem, whereas the second clearance is wider to accommodate production tolerances in positioning of the stems etc. In some aspects the key hole of the first type and the key hole of the second type are arranged at diagonally opposing corners. Thereby the document cover can be held in place in an accurate orientation, while accommodation production tolerances without inducing twisting of the document cover.

In some embodiments the magnet system comprises an electro-magnet. The electro-magnet may be controlled adaptively from an image quality measure, such as blurring, or via a user controlled setting controlling the magnetic force of the of electro-magnet.

There is also provided a flatbed scanner configured as an optical large format flatbed document scanner.

Herein, the term 'document' comprises single sheet document such as a paper document, sheets of fabrics, textiles, canvas, books, magazines etc.

Herein, the term 'substantial area' may be more than 40% of an area of the transparent plate, such as more than 50% of the area of the transparent plate, or more than 75% of the area of the transparent plate. Use of the term 'substantial area' may also comprise completely covering or extending beyond the expanse of the transparent plate.

Herein, the term 'deflection' refers to the excursion of a point on a plate in a direction normal to the face of the plate. When the plate is substantially horizontal a downwards deflection is generally denoted 'deflection'. An upwards deflection is denoted an 'upwards deflection', an 'upwardly deflected shape' or a 'cambered shape'. The term 'deflection' also refers to the distance of the excursion (measured in millimeters).

Herein, the term 'magnetic' refers to the property of a metal being capable of being magnetically attracted by a magnet.

Herein, the term 'magnet' refers to the property of a metal being magnetized to attract another 'magnet' or a 'magnetic' metal object. Magnets may be permanent magnets such as ferro-magnets e.g. neodymium magnets.

BRIEF DESCRIPTION OF THE FIGURES

A more detailed description follows below with reference to the drawing, in which.

DETAILED DESCRIPTION

Figure 1:
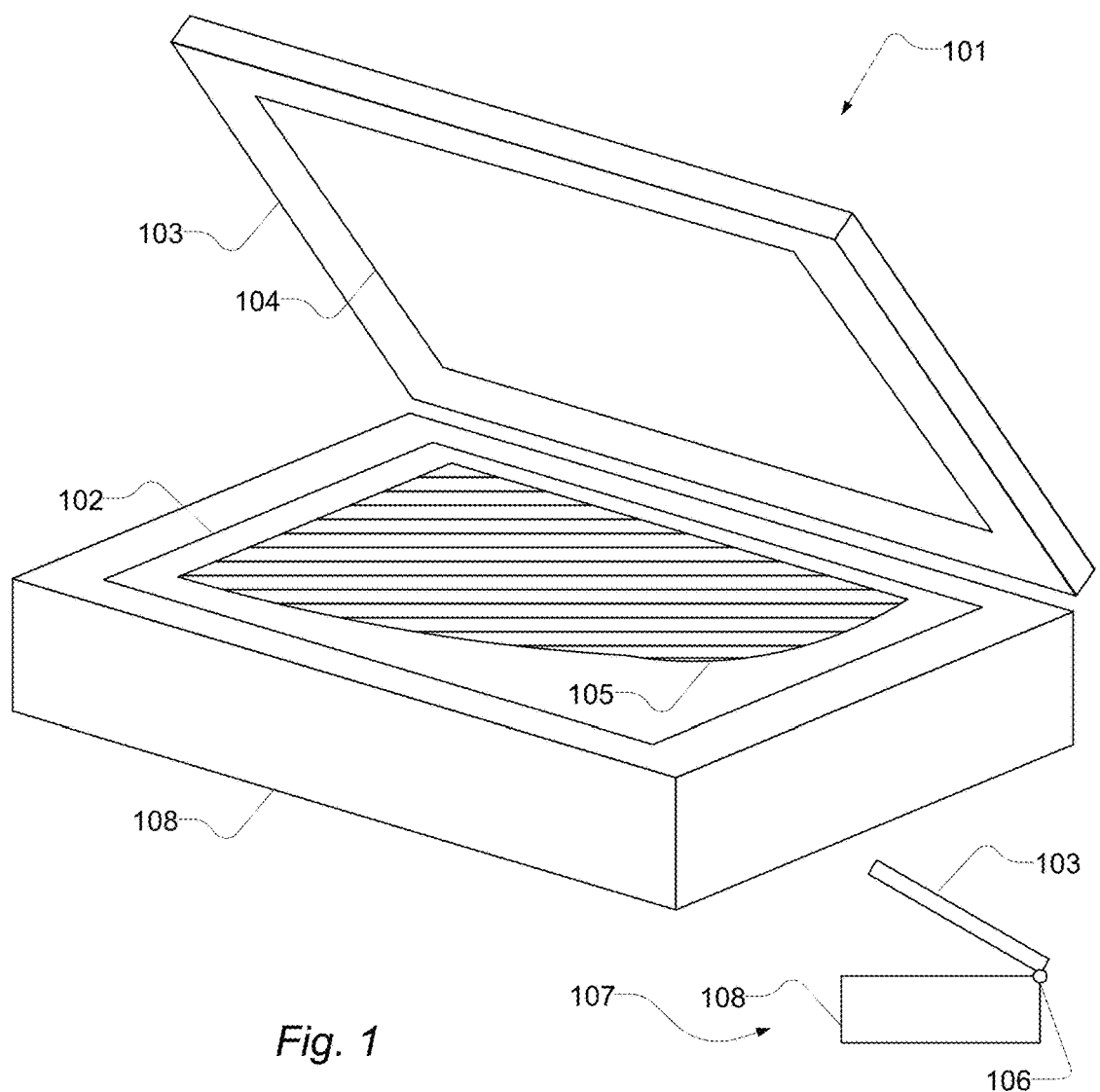
FIG. 1 shows a perspective view and a side-view of a flatbed scanner.

FIG. 1 shows a perspective view and a side-view of a flatbed scanner. The flatbed scanner 101 has a scanner body 108 which accommodates an electro-mechanical system comprising a camera and an optical system (not shown) performing scanning operations. The camera and the optical system may comprise one or more Contact Image Sensors. The flatbed scanner 101 has a transparent plate 102 whereon a document 105 can be placed with its side to be scanned facing the transparent plate for scanning as it is known in the art. Below the transparent plate 102, one or both of the camera and the optical system is arranged to move with a carriage to scan at least a portion of the document. The flatbed scanner 101 comprises a lid 103, which may be attached to the scanner body 108 by a hinge 106 as shown in the side-view 107. In some embodiments the lid 103 is movable relative to the scanner body 108 by one or more of an arm, a swivel and a hinge. The arm, swivel and/or hinge may have a gas spring to assist opening and/or closing of the lid. In some embodiments the lid is a lifting member to which the document cover is attached as a device to assist moving the document cover. The lifting member may comprise one or more of an arm, a swivel and a hinge.

The lid may have a handle or grip. The lid may be configured with support pads or areas for resting against the portions of scanner body 108 when in a closed position. The portions of scanner body 108 against which the lid may rest may be located on a top surface of the scanner body 108, not at the transparent plate 102, unless the transparent plate is supported at such areas.

The lid 103 carries a document cover 104, which may have a uniform tone of white/grey/black or a uniform colour. The uniformness of the document cover serves the purpose, when the lid is closed, of providing uniform optical background to the document being scanned and to apply a moderate force to the document being scanned such that it lies relatively flat against and generally in contact with the transparent plate 102.

Figure 2:
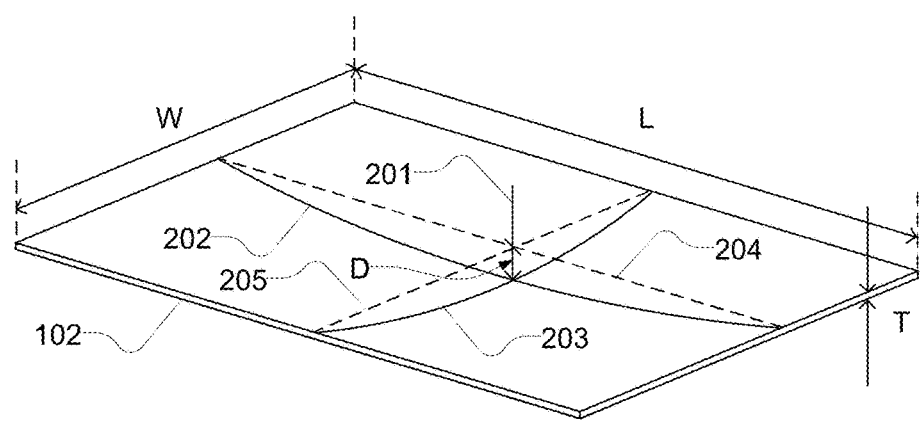
FIG. 2 shows a perspective view of a deflected transparent plate for a flatbed scanner.

FIG. 2 shows a perspective view of a curved transparent plate for a flatbed scanner. The transparent plate 102 has a length L, a width W and a thickness T.

The transparent plate 102 is shown in a deflected state in which the plate deflects downwards from a plane represented by dashed straight lines 204 and 205 to assume a double curved shape represented by curved lines 202 and 203. At a centre point, e.g. at arrow 201, the transparent plate 102 has a deflection D. In general, herein, deflection or deflected shape is used as a term to designate a downward curvature, whereas camber or cambered shape is used to designate an upward curvature. Downwards relate to the direction of gravitational force. Thus, a plate deflected with its one side facing up, assumes a cambered shape when turned up-side-down if kept in a 'frozen' (fixed) shape.

The transparent plate 102 for a flatbed scanner may be a rectangular transparent plate, e.g. a soda-lime float glass plate, selected from the group of:
  a glass plate with a thickness of about 3 millimeters and a rectangular size of about 42 to 55 centimeters by 60 to 75 centimeters,
  a glass plate with a thickness of about 4 millimeters and a rectangular size of about 59 to 70 centimeters by 84 to 100 centimeters,
  a glass plate with a thickness in the range of about 2.8 to 5 millimeters and a rectangular size larger than 42 centimeters by 60 centimeters.

For a transparent plate 102 at such a size, the deflection D conventionally amounts to one millimeter or more. At least for some cameras and/or optical systems such a deflection exceeds tolerances within which the document can be reproduced at a sufficient good quality.

However, the deflection D may be reduced to deflect less than 0.2 millimeters, such as 0.03 to 0.09 millimeters. By means of a fixation of the transparent plate as described in more detail below such reduced deflection can be achieved, which in turn may bring deflection within tolerances within which a document can be reproduced at a sufficiently good quality.

FIGS. 3-8 show cross-sectional views of a flatbed scanner at steps of its manufacture. At the steps of the manufacture the transparent plate 102 is fixated to a square frame with four frame elements joined to each other at right angles. The frame elements are denoted lateral frame elements and end frame elements. These steps of manufacture takes place on a reference bench 301 with a predefined degree of planeness e.g. obtained by precision cutting, milling and/or grinding. The reference bench may be made from stone, metal, and/or a composite material.

Figure 3:
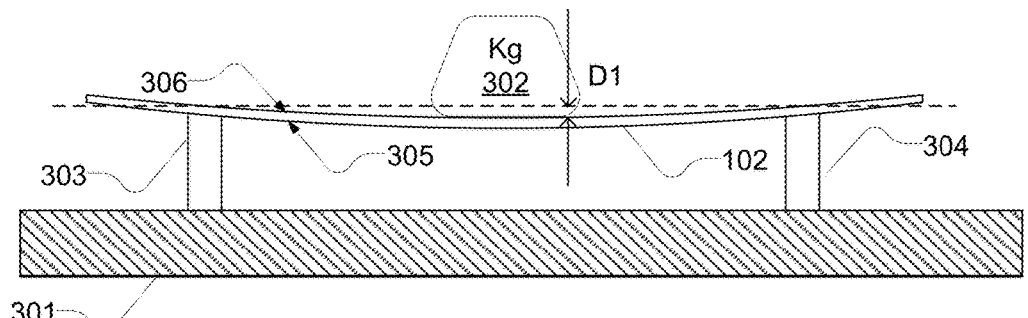
FIGS. 3-8 show cross-sectional views of a flatbed scanner during its manufacture.

FIG. 3 illustrates a first stage of the manufacture at which support stays 303 and 304 or other types of precision spacers are arranged on the reference bench 301 and the transparent plate 102 is laid atop of the support stays 303 and 304, upside-down, with its topside 305 facing down and its underside facing up. The topside 305 faces upside when the flatbed scanner is in a normal operation.

The support stays are positioned e.g. at a distance from the edge of the transparent plate to leave space for illuminating a glue seam as described below. Then a predefined load e.g. in the form of a deflection weight 302 is placed at a centre portion of the transparent plate 102 to inflict a predefined deflection, D1, of the transparent plate. The predefined load acts as a downward force on the transparent plate 102.

Figure 4:
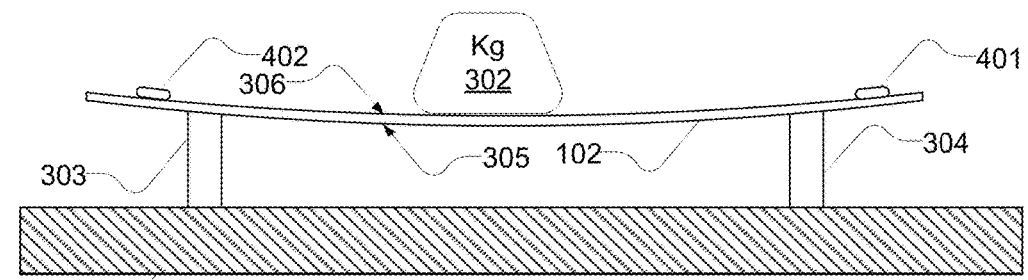

FIG. 4 illustrates a second stage of the manufacture at which, while the predefined load acts on the transparent plate to keep the predefined deflection, D1, glue seams 401; 402 are laid out at predefined regions on the upwardly facing underside 306. In some embodiments, the glue seams 401; 402 are laid out as an uninterrupted glue seam, where 401 indicates the glue seam along one lateral frame element and 402 indicates the glue seam along another lateral frame element. In other embodiments the glue seams 401; 402 are laid out as multiple glue seams in continuation of each other or side-by-side. In some embodiments the glue seam is applied at spots. The glue seam is laid out in a wet or non-cured condition.

Figure 5:
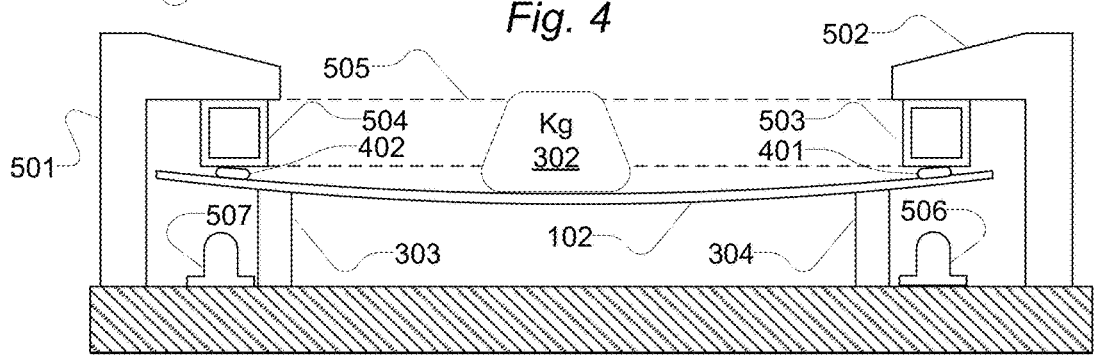

FIG. 5 illustrates a third stage of the manufacture at which, at which the frame, with lateral elements 503 and 503 and end elements 505, is positioned precisely in a horizontal and vertical position with respect to the transparent plate while the glue seam is in a wet, non-cured or pre-cured condition. A support jig 501; 502 is attached to the frame e.g. at two positions on the lateral frame element 504 and at one position on the lateral frame element 503. The frame may be provided with flanges or holes for attaching the frame to the jig by screws during this step of manufacture. The frame is lowered into the wet glue applied to the underside 306 of the transparent plate 102 and is kept in a fixed position by means of the support jig 501; 502. Glue is applied in a sufficient thickness that the glue seam is deformed when the frame is lowered into the wet glue.

Thus, still while the predefined load acts on the transparent plate to keep the predefined deflection, D1, glue seams 401; 402 in a wet condition connects to the frame which is kept in a fixed position. In that state, the glue seams 401; 402 are illuminated by ultra-violet light emitted from light sources 506; 507. The light sources are arranged below the transparent plate 102 and illuminates the glue seams 401; 402 through the transparent plate. The transparent plate and the frame remains supported by the support jig 501; 502 and the support stays 303; 304 until the glue seams are cured and thus hardened to form a rigid bonding between the frame and the transparent plate.

Figure 6:
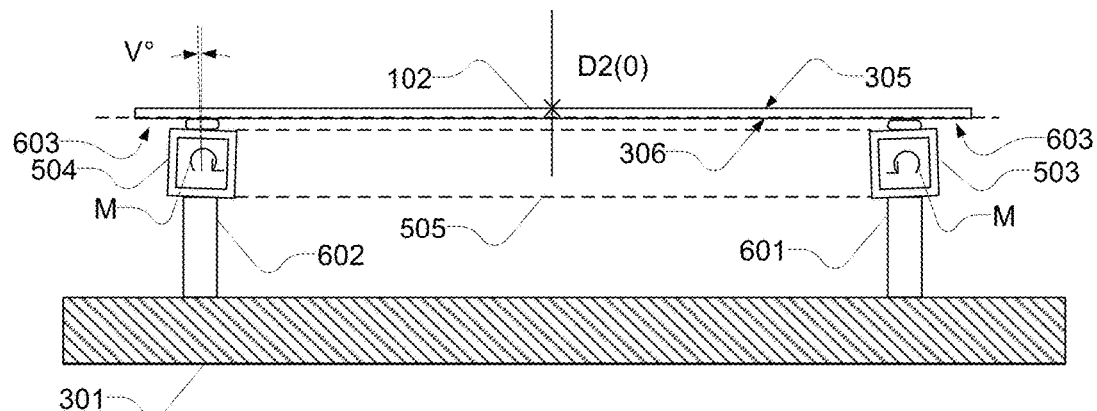

FIG. 6 illustrates a fourth stage of the manufacture at which the glue seams 401; 402 have cured and at which the frame and transparent plate are rigidly bonded together by a hard glue seam to form a combined rigid element. At this fourth stage the frame and transparent plate are turned upright with the topside 305 of the transparent place 102 facing upwards. The frame rests on frame support stays 601; 601.

It is shown that the deflection weight 302 is removed and that the transparent plate 102 has a substantially plane (flat) shape. The deflection D2(0) is shown to illustrate that the transparent plate is substantially plane, hence the zero in parenthesis.

The transparent plate 102 assumes the substantially plane shape, because the lateral frame elements and the end frame elements resist against the twisting moment, M, they are exposed to via the rigid glue seam bonding the transparent plate and frame rigidly together from the gravitational force acting on the transparent plate. Thus, whereas the frame had only minimal tension from twisting moments in its lateral frame elements and end frame elements, the frame elements now have a significantly higher tension from twisting moments. The significantly higher tension from twisting moments is illustrated by curved arrows about the centre of the lateral frame elements 503; 504. The twisting moments may give rise to a slight rotation, V, of the frame elements.

In this way the transparent plate (rigidly fixed to the frame) may assume a substantially plane shape despite of the fact that the transparent plate (supported on, but not rigidly attached to the frame) has a significant deflection under its own weight.

At the fourth stage of the manufacture, the frame elements (504;503;505) are configured with mechanical strain, corresponding to a twisting moment, M, about longitudinal axes of the frame elements. The mechanical strain is greater in a state wherein the transparent plate is relatively plane compared to a state wherein the transparent plate 102 is supported to have a cambered and less plane, shape. Mechanical strain in the frame elements is lower in the third stage of the manufacture (shown in FIG. 5) than the mechanical strain in the frame elements in the fourth stage of the manufacture. The flatbed scanner will thus be configured to have the mechanical strain in the fourth stage of manufacture. The mechanical strain can be measured by strain gauges configured and applied to measure tension about a longitudinal axis of the frame elements.

It is appreciated that a 100% plane transparent plate is very hard to achieve at least under varying loads of the transparent plate and within production tolerances of the transparent plate. Thus, a predefined planeness of the transparent plate rigidly bonded to the frame may be specified. The predefined planeness may range from a predefined deflection (downwards) to a predefined camber (upwards) and comprise completely plane. To account for the weight of a document and/or document cover resting against the document and/or transparent plate, the predefined planeness may be specified to range over a predefined camber.

The transparent plate is rigidly bonded to the frame by the hard glue seam to assume a predetermined deflected shape when turned upside-down and to deform with the rectangular metal frame under its own load to a cambered shape, a flat shape or a less deflected shape when turned upright in a normal position.

In some aspects the frame has frame elements, with a rectangular cross-section, joined together at right angles. The frame elements may have a 45° cut, be made of metal and be welded together. Such a frame can be manufactured at reasonable costs. The frame may have frame elements with a cross-section different from a rectangular cross-section. The frame elements may have a pentagon, hexagon or other type of cross-section. The frame may have flanges or protrusions for being supported in the scanner body.

As can be seen the transparent plate 102 has an overhang 603 along one or more sides with respect to at least some of the frame elements 503,504,505. The overhang may be provided at one or more edges of the transparent plate e.g. at all four edges.

Figure 7:
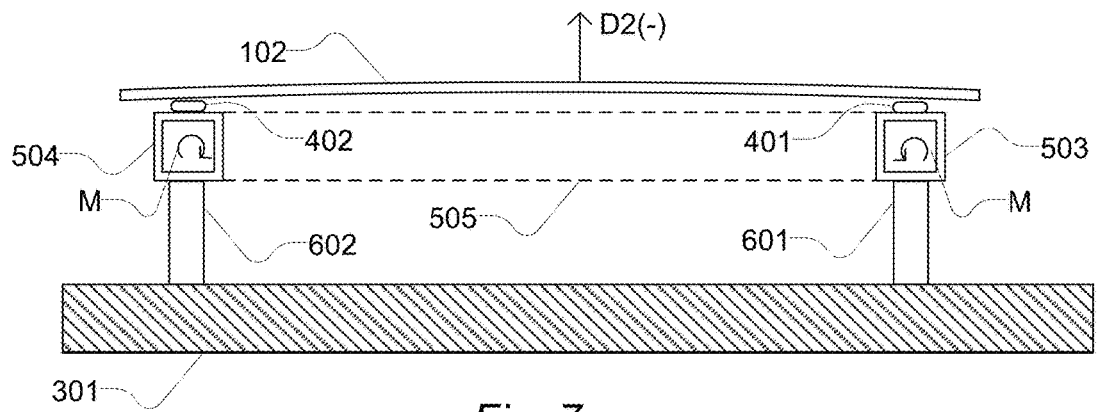

FIG. 7 illustrates the fourth stage of the manufacture, but in an embodiment wherein the transparent plate 102 has a predefined camber, D2(−), which is a negative deflection, hence the minus in parenthesis. The predefined camber, D2(−) is smaller than the deflection D1 when the deflection weight 302 acts on the transparent plate and smaller than a deflection, D0, when under its own weight only.

Figure 8:
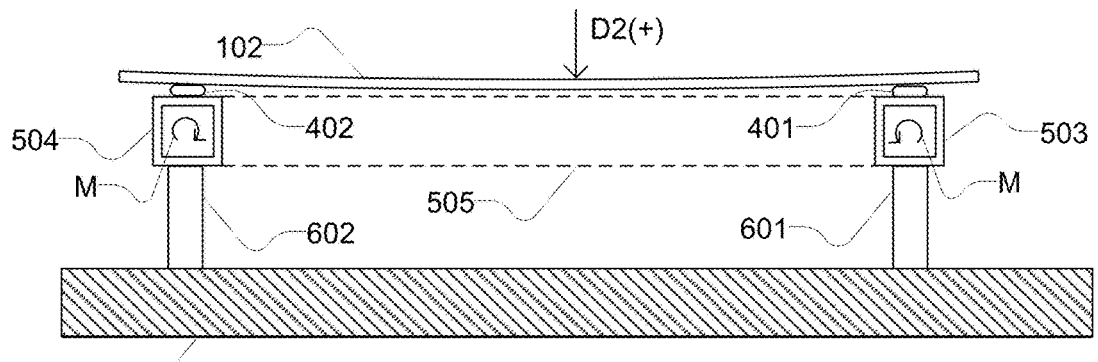

FIG. 8 illustrates the fourth stage of the manufacture, but in an embodiment wherein the transparent plate 102 has a predefined deflection D2(+), which is smaller than the deflection D1 when the deflection weight 302 acts on the transparent plate and smaller than a deflection, D0, when under its own weight only.

Also in the embodiments of FIGS. 7 and 8, the frame elements 504;503;505 of the frame are configured with mechanical strain, corresponding to a twisting moment, M, about longitudinal axes of the frame elements. The mechanical strain is greater in a state wherein the transparent plate is relatively plane compared to a state wherein the transparent plate 102 is supported to have a cambered and less plane shape.

Thus, the mechanical strain is induced during manufacture, before the glue seam has hardened to form a rigid bonding, by pre-pending the transparent plate to assume a double-curved shape or by applying a twisting moment to the frame elements while the transparent plate has a predefined shape such as a plane shape.

The pre-pending of the plate may be induced by supporting or lifting the transparent plate at a centre portion while keeping the edges of the transparent plate at a fixed vertical level or by loading a centre portion of the transparent plate while it is turned upside-down and supported e.g. by the frame at or about its edges. The twisting moment is applied e.g. at a middle portion of a frame element or at several positions along the frame elements. The twisting moment may be applied to lateral frame elements, but not to end frame elements or to all frame elements.

Figure 9:
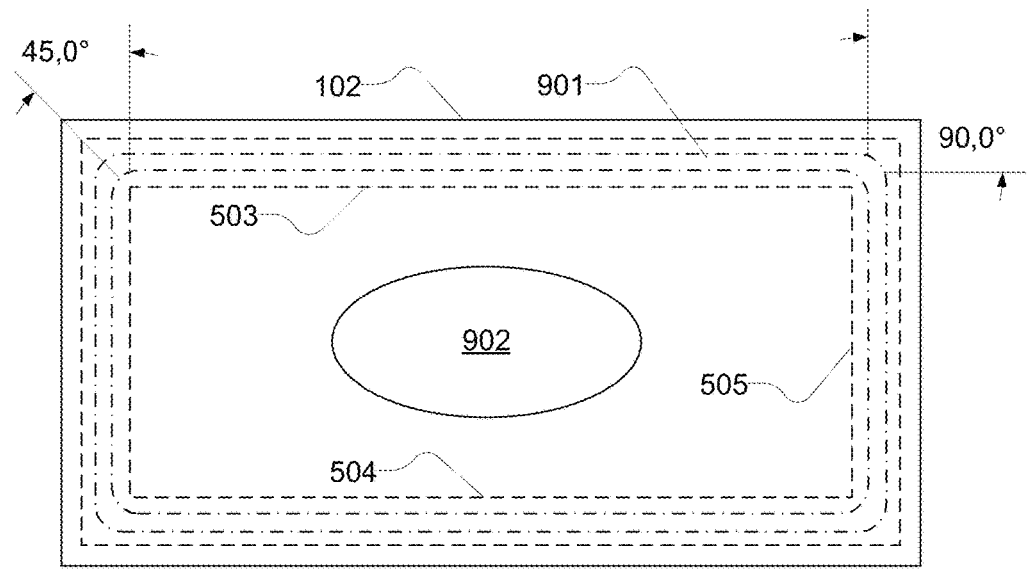
FIG. 9 shows a top-view of a transparent plate and a glue seam.

FIG. 9 shows a top-view of a transparent plate and a glue seam. This view shows, with respect to the transparent plate 102, the glue seams 401; 402 laid out as an uninterrupted glue seam 901 at a centre portion of the topside of the frame elements comprising the lateral frame elements 503; 504 and the end frame elements 505. A central area of the transparent plate is designated by reference numeral 902. At this central area the deflection weight 302 may be placed.

It is shown that the frame elements may be have end faces cut to 45 degrees for being joined at right angles, 90 degrees. The frame elements may be joined e.g. by welding.

Figure 10A:
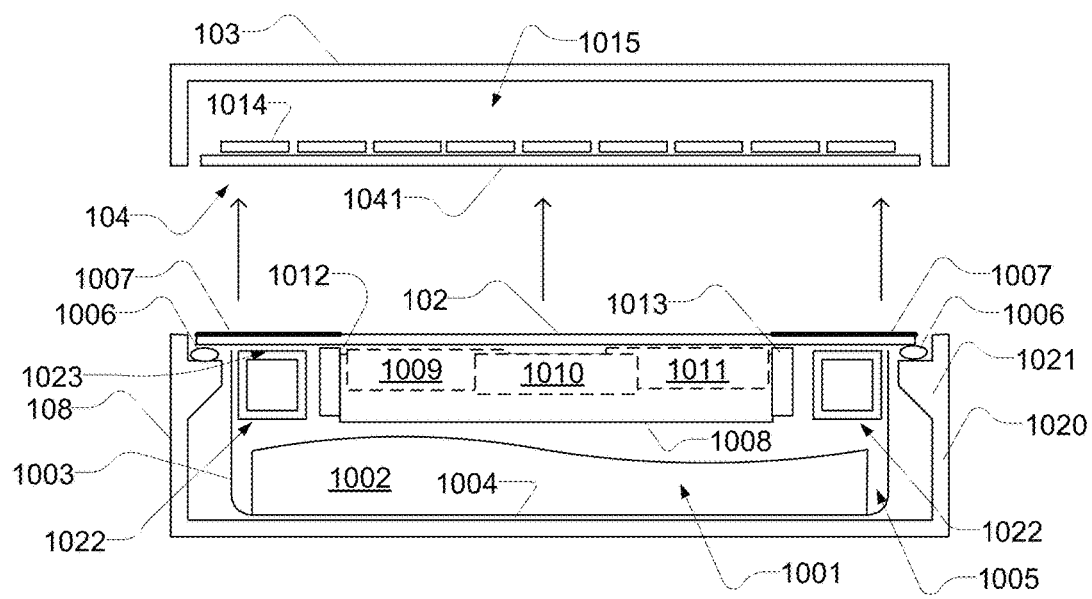
FIG. 10a shows a cross-section of a flatbed scanner and a lid for a flatbed scanner.

FIG. 10a shows a cross-section of a flatbed scanner and a lid for a flatbed scanner. The lid 103 is shown in an offset position relative to the scanner body 108 of the flatbed scanner 101.

The lid 103 is formed as a downwardly extending skirt creating a lid compartment 1015. The lid compartment 1015 accommodates the document cover 104 and weight members 1014 attached to the (flexible) document cover 104 such that the document cover acts to press the document towards and against the transparent plate 102 when the lid 103 is closed and a document is laid on the topside of the transparent plate. The document cover and the weight members 1014 will be described in more detail further below.

The scanner body 108 is formed as upwardly open compartment with upright sidewalls 1020 with a shelf or protrusion 1021 forming a recess with respect to the sidewall 1020. The recess accommodates a periphery portion of the transparent plate 102 and a finish joint 1006 to provide a flush surface transition between the transparent plate and the scanner body 108. The finish joint 1006 may be a glue seam that runs between at least some abutting portions between the peripheral edges of the transparent plate and the large format document scanner body 108. This finish joint, e.g. a silicone based joint, may have a Shore A hardness of about 30-55, which is not rigid and which is far less hard than the hard glue seam applied between the frame and the transparent plate. The finish joint may alternatively be a foam or rubber-based tape band. Thereby, the risk of transferring mechanical tension from the scanner body to the transparent plate is minimized.

The transparent plate 102 may have a brim cover 1007 which may be an opaque band hiding technical means, such as the frame, accommodated in the scanner body 108.

The transparent plate 102 and the frame is kept in place and fixed to the scanner body by means of a chassis 1001. The chassis has a bottom portion 1004, chassis side walls 1003 and chassis end walls 1002. The frame to which the transparent plate 102 is bonded, is attached to the chassis side walls 1003 and the chassis end walls 1002 e.g. by means of screws or spot welds.

A movable carriage 1008, described in greater detail further below, carries line cameras 1009, 1010 and 1011 illustrated by dashed lines. The line cameras 1009, 1010 and 1011 are aligned along two parallel lines transverse to the cross-section as it is known in the art of large format scanners. The movable carriage 1008 is pressed against the underside of the transparent plate 102 e.g. at an opaque section, like the brim cover described above. The movable carriage 1008 has wheels 1012 and 1013 at each of its ends rolling on the underside of the transparent plate 102.

Figure 10B:
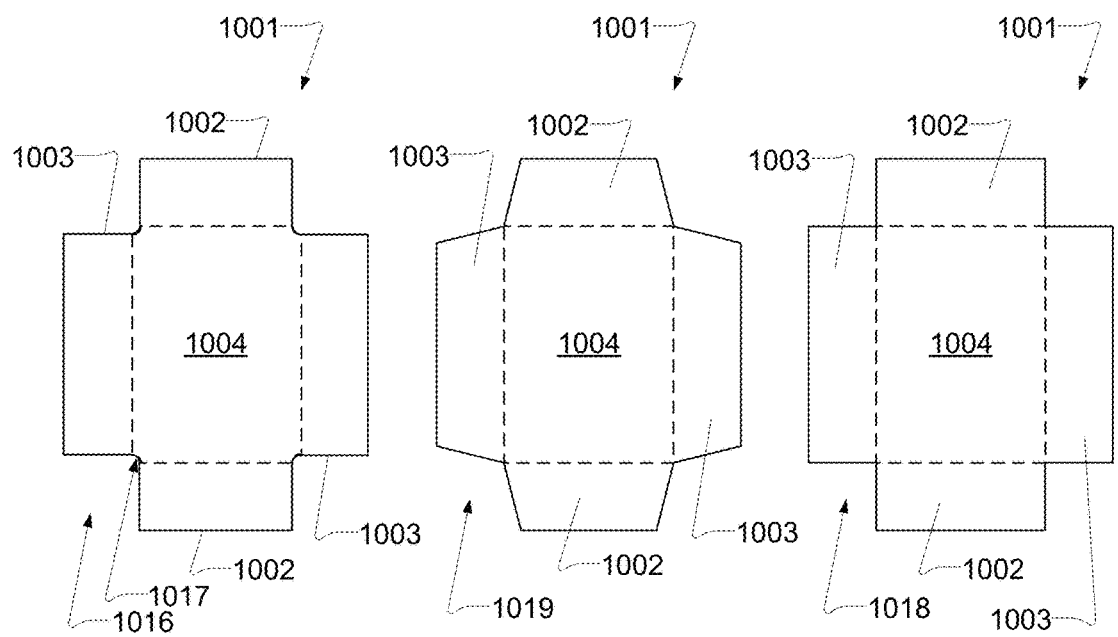
FIG. 10b shows embodiments of the chassis plate.

FIG. 10b shows embodiments of the chassis plate. The chassis plates 1001 are shown in a flat shape, with broken lines indicating bending lines, before the chassis plates are bent into the shape shown in FIG. 10a. The central portion of the chassis plates, within the bending lines, is the chassis bottom.

The chassis plate shown to the left hand side has cut-outs 1016 at its corners, at substantially right angles, leaving a curved inner corner 1017 at each cut-out. The bending lines do not intersect on the chassis plate whereby corners between a chassis end wall 1002 and a chassis side wall 1003 get a chassis gap 1005.

The chassis plate shown to the right hand side has cut-outs 1018 at substantially right angles. The bending lines may intersect at the corners or not intersect on the chassis plate whereby corners between a chassis end wall 1002 and a chassis side wall 1003 get a chassis gap 1005.

The chassis plate shown in the middle has cut-outs 1019 at its corners, at inclined angles, leaving the chassis plate with obtuse-angled cut-outs.

The plate is bent into shape with erect end walls and side wall, but the chassis remains with chassis gaps 1005 at its vertical corners.

Figure 11:
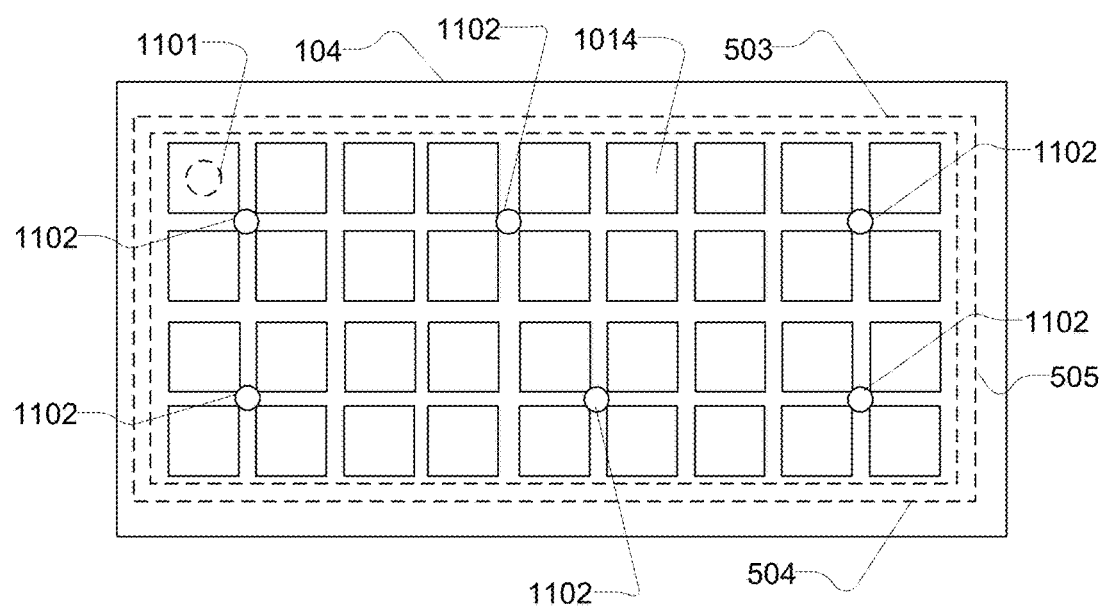
FIG. 11 shows a top-view of a document cover.

FIG. 11 shows a top-view of a document cover. The document cover 104 comprises a flexible contact sheet, shown as a rectangle, carrying multiple weight members 1014, shown as multiple rectangles. The frame is illustrated by dashed lines illustrating the lateral frame elements 503; 504 and the end frame element 505. The weight members 1101, which may be plates such as metal plates, are adhesively attached to the flexible contact sheet at a centre spot and is not glued to the flexible contact sheet at peripheral portions about the centre spot. Glue 1101 is applied at a central portion of each of the weight members 1014. In some embodiments the flexible contact sheet is a white plastic sheet with a thickness in the range of 1-3 millimeters. In some aspects the plastic sheet is made from ABS, PS or PC.

Document cover suspension members 1102 may be located across the document cover 104 as elongated erect members that extend from the document cover 104. The document cover suspension members 1102 may be glued to or welded to the flexible contact sheet. As described in more detail below, the document cover suspension members 1102 may be configured with a head on a stem.

The weight members, which may be plates, each have an expanse and position on the flexible contact sheet such that they collectively cover at least a substantial area of the rectangular transparent plate. As shown, the weight members 1014 are arranged within the area covered by the frame, but they may also extend beyond the area covered by the frame.

As described in more detail below, the multiple weight members 1014 may be magnetic e.g. metal plates. A stationary magnet system may be attached to the movable carriage and magnetically attract the magnetic weight members 1014, through the flexible contact sheet (which is a non-magnetic and not magnetically shielding material), towards the movable carriage and thereby exert a force acting on the physical document.

Figure 12:
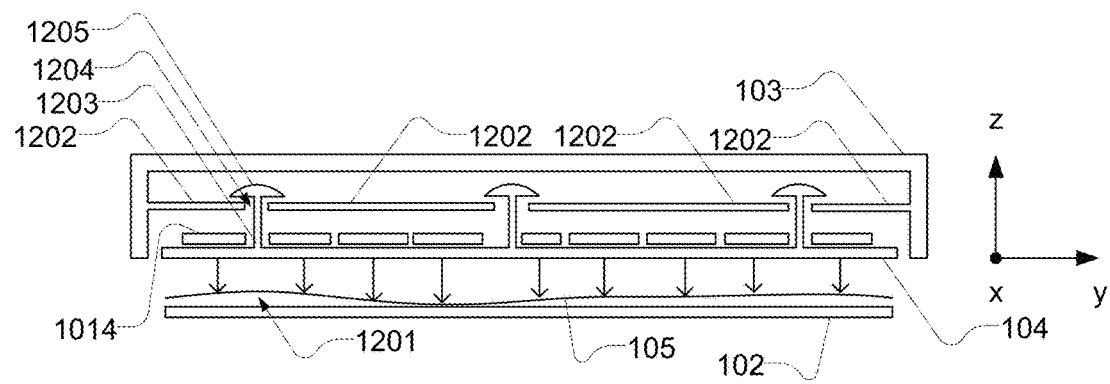
FIG. 12 a cross-section of a lid for a flatbed scanner with a document cover.

FIG. 12 shows a cross-section of a lid for a flatbed scanner with a document cover. The document cover 104 carries the multiple weight members 1014 on its topside and suspension members, such as of the mushroom type, extends upwards therefrom. On its underside, the document cover 104 has a plane and uniformly toned/coloured surface facing the transparent plate 102 and a document 105 resting on the transparent plate.

The suspension members of the mushroom type comprise a stem 1203 and a head 1205. The stem 1203 extends through a hole 1204, such as a hole with a keyhole shape, in a suspension plate 1202 attached to or integrally formed with the lid 103. The stems may have some clearance with respect to the holes 1204 in the suspension plate 1202 such that the stem can move freely at least vertically. The stems 1203 have a sufficient length and the suspension plate is arranged at a vertical distance from the lid that the contact sheet can flex or adapt to a document while being upwardly decoupled from vertical pressure from the lid. As can be seen the suspension plate 1202 is raised relative to a lower rim or other support of the lid 103 such that the document cover 104 carrying the multiple weight members 1014 on its topside hangs freely when the lid is lifted away from the transparent plate and lays upwardly decoupled from vertical pressure from the lid when the lid is closed.

It is shown that the lid is raised some distance from the transparent plate 102 and that a document 105 has a wavy shape, e.g. from soft folds, causing gaps 1201 where the document 105 lifts off from the transparent plate. Such a 'lift off' would cause a less accurate scanning of the document since the surface of the document may be outside a focus range of the scanning camera. When the lid is closed and is not raised some distance from the transparent plate 102, the document cover keeps the document in contact with the transparent plate to the extent that the gravitational force of the document cover on the document can remove the gaps.

Figure 13:
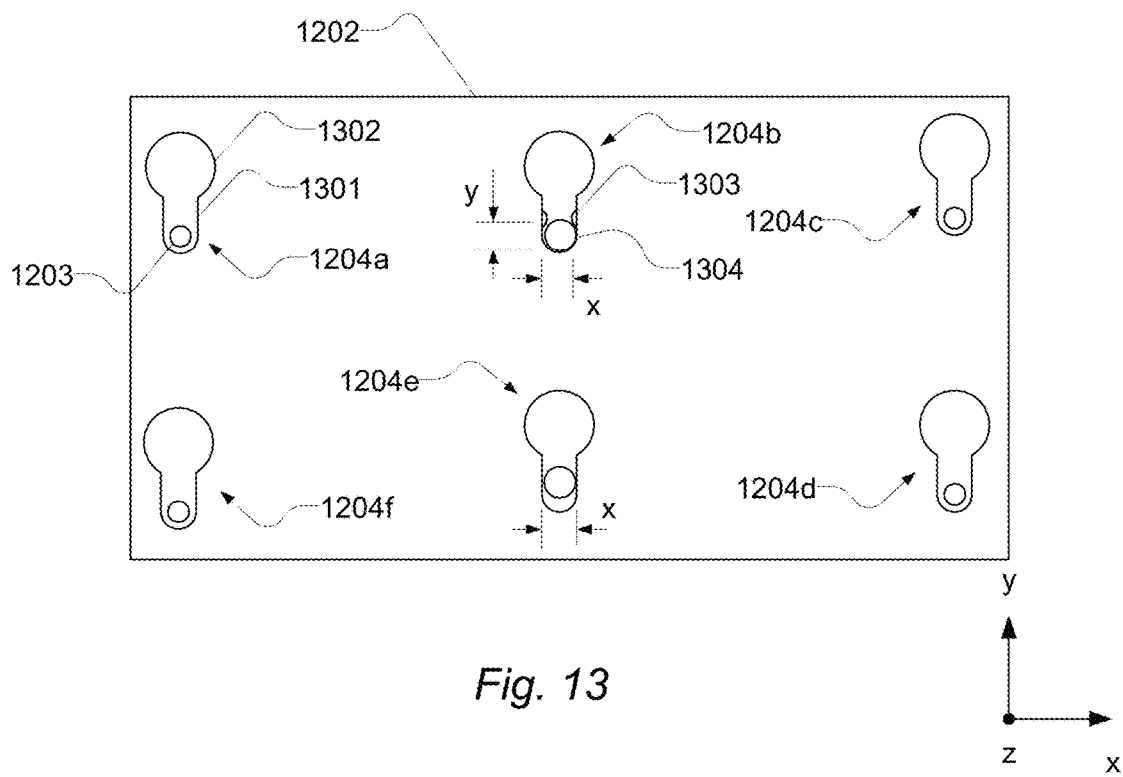
FIG. 13 shows a horizontal cross-section of a lid for a flatbed scanner.

FIG. 13 shows a horizontal cross-section of a lid for a flatbed scanner. The horizontal cross-section of the lid 102 shows the suspension plate 1201 with a layout of the holes 1204, which have a keyhole shape. The keyholes are similar, but are configured in a slightly different way.

The suspension plate 1202 is configured with keyholes of a first type. The keyholes 1204a, 1204c, 1204d and 1204f of the first type have an oblong portion 1301 with a width equal to the diameter of a stem plus a clearance that allows it to move freely in a vertical direction and to accommodate production tolerances in positioning of the keyholes and the stems across the suspension plate or document cover. The oblong portion 1301 of the keyhole extends from a substantially circular portion 1302.

The suspension plate 1202 is additionally configured with one or more keyholes 1204b of a second type. The keyhole of the second type has an oblong portion that has a resilient constriction 1303 fixating the stem of a coupling member horizontally. The document cover thereby remains in a fixed horizontal position with respect to the suspension plate.

The suspension plate 1202 is additionally configured with one or more keyholes of a third type. The keyhole 1204e of the third type has an oblong portion with a width equal to the diameter of a stem plus a third clearance. The third clearance is sufficient to allow a free vertical movement of the stem, but the clearance is small enough (in a direction transverse to the oblong portion) to prevent rotation of the document cover about the stem sitting in the keyhole 1204b. The oblong portion of the keyhole 1204e is sufficiently long that the stem extending through the keyhole 1204e can be accommodated despite some production variations in positioning the stem.

Thus the keyhole 1204b fixates the document cover in all horizontal directions, the keyhole 1204e fixates the document cover transversely, and the other keyholes have some wider clearance, but keeping the document cover suspended in the vertical direction by holding the heads of the stems.

Figure 14:
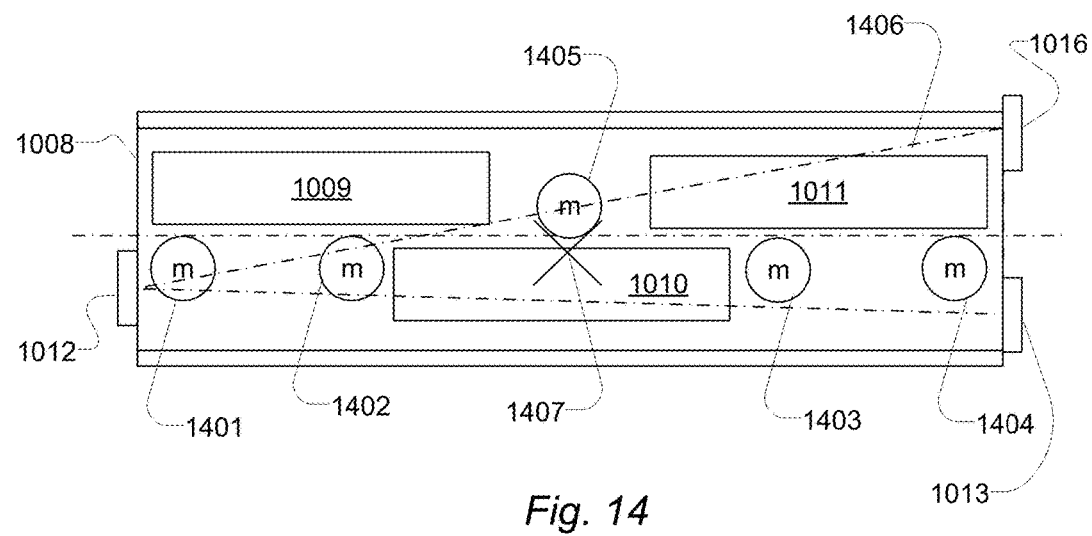
FIG. 14 shows a top-view of a movable carriage, for a flatbed scanner, carrying a line camera.

FIG. 14 shows a top-view of a movable carriage, for a flatbed scanner, carrying a line camera. The movable carriage 1008 has three wheels 1012, 1013 and 1016 arranged on a respective axis to roll against the underside of the transparent plate and keep the line cameras 1009, 1010 and 1011 at a predefined distance from the transparent plate. Two wheels 1013 and 1016 at one end of the movable carriage and one wheel 1012 at the other end keep the movable carriage stable. The movable carriage 1008 may have a U-shaped profile to span the width of the flatbed scanner, with virtually zero deflection of the U-shaped movable carriage, while moving in the longitudinal direction of the flatbed scanner. The line cameras 1009, 1010 and 1011 are arranged longitudinally in a zig-zag pattern, i.e. aligned on two parallel and longitudinal lines, as it is well-known in the art.

It is shown that magnets, indicated by letter 'm' and with reference numerals 1401, 1402, 1405, 1403 and 1404 are arranged next to the line cameras 1009, 1010 and 1011. The magnets are collectively denoted a magnet system and engages magnetically with magnetic weight members such as metal plates. The magnet system is attached to the movable carriage and configured to magnetically attract the document cover or the one or more magnetic plates towards the movable carriage and thereby exert significant force acting on the physical document when supported on the rectangular transparent plate. Thereby a compressing force is applied to an original document resting on the transparent plate at an area at which the movable carriage currently is located while scanning a line of the original document. The magnetically induced compressing force acts to flatten out wrinkles in a creased sheet without requiring excessive weight or downwardly acting mechanical means throughout the transparent plate which in turn causes significant deflection of the transparent plate especially for large format document scanners.

A magnetic centre is designated by reference numeral 1407 and indicates the position of the magnetic centre of the magnets 1401, 1402, 1405, 1403 and 1404. In case the magnets are equally strong, the magnetic centre is geometric centre position of the positions of the magnets.

The magnetic centre 1407 is located inside a triangle 1406, with its corners located where the three wheel's axes cross the movable carriage, thereby the magnetic force between the magnet system and the magnetic weight members improves stability of the carriage.

Figure 15:
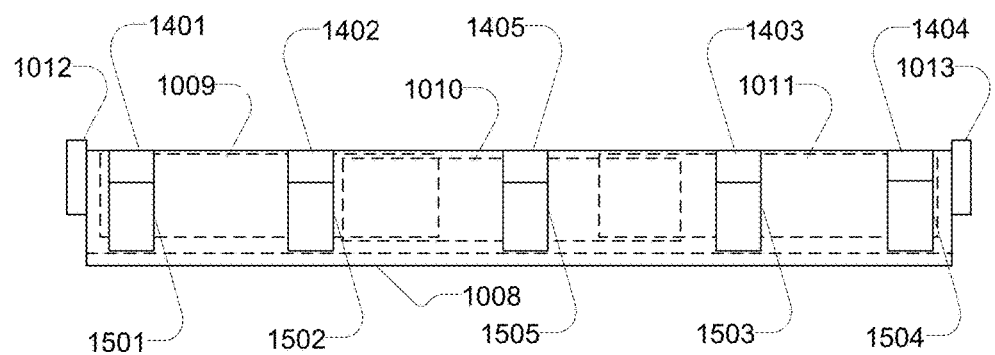
FIG. 15 shows a side-view of the movable carriage, for a flatbed scanner, carrying a line camera.

FIG. 15 shows a side-view of the movable carriage, for a flatbed scanner, carrying a line camera. The side-view of the movable carriage 1008 illustrates that the magnets 1401, 1402, 1405, 1403 and 1404 are arranged on support stays 1501, 1502, 1505, 1503 and 1504 respectively. Thereby the magnets may be moved closer to the transparent plate and thus the magnetic weight members to improve the magnetic coupling.

In some embodiments the flatbed scanner comprises a frame with an upwardly facing plane face; and a transparent plate, for supporting a large format document; wherein the transparent plate overlies the upwardly facing plane face of the frame, wherein the transparent plate and the frame are bonded together by a hard glue seam that runs on the upwardly facing plane face of the frame and forms a rigid bonding between the transparent plate and the frame; wherein frame elements of the frame are configured with mechanical strain, corresponding to a moment about longitudinal axes of the frame elements, wherein the mechanical strain is greater in a state wherein the transparent plate is relatively plane compared to a state wherein the transparent plate is supported to have a cambered, and less plane, shape.

In some embodiments the glue seam is selected to have a hardness selected from the groups of:
- a shore-D hardness greater than 50;
- a shore-D hardness greater than 60;
- a shore-D hardness greater than 70;
- a shore-D hardness greater than 80;
- a shore-D hardness in the range of: greater than 60 and less than 90.

In some embodiments the transparent plate is selected from the group of:
- a substantially rectangular glass plate with a thickness of about 3 millimeters and a rectangular size of about 42 to 55 centimeters by 60 to 75 centimeters,
- a substantially rectangular glass plate with a thickness of about 4 millimeters and a rectangular size of about 59 to 70 centimeters by 84 to 100 centimeters,
- a substantially rectangular glass plate with a thickness in the range of about 2.8 to 5 millimeters and a rectangular size larger than 42 centimeters by 60 centimeters.

In some embodiments the transparent plate bonded to the frame by the hard glue seam deflects less than 0.2 millimeters, such as 0.03 to 0.09 millimeters, at a centre position when turned upside-down and loaded by a 1 Kg load placed within a centre area being less than half the area of the transparent plate.

In some embodiments the transparent plate is a substantially rectangular transparent plate.

As a first item, there is provided a flatbed scanner (101) comprising:
- a scanner body (108) accommodating a transparent plate (102) for supporting a physical document;
- a document cover (104) comprising a sheet member with an expanse covering at least a substantial area of the transparent plate; wherein the document cover has an underside;
- a movable carriage (1008) extending across the transparent plate in a transverse direction and configured to move below the transparent plate in a longitudinal direction; wherein the movable carriage carries a camera or an optical system for a camera;

wherein the sheet member, of the document cover, is magnetic or carries one or more magnetic plates; and wherein a magnet system is attached to the movable carriage and configured to magnetically attract the sheet member or the one or more magnetic plates towards the movable carriage and thereby exert a significant pressing force acting on the physical document when supported on the transparent plate.

Thereby a compressing force is applied to an original document resting on the transparent plate at an area at which the movable carriage currently is located while scanning a line of the original document. The magnetically induced compressing force acts to flatten out wrinkles in a creased sheet without requiring excessive weight or rigid mechanical means acting downwards on the document. Excessive weight or rigid mechanical means acting downwards on the document causes significant deflection of the transparent plate especially for large format document scanners.

In some aspects, of the first item, the camera, arranged on the carriage, comprises multiple line cameras oriented in the transverse direction and arranged along two parallel rows in a staggered configuration; wherein the carriage is upwardly supported at three points; and wherein the magnet system comprises multiple magnets arranged next to the multiple line cameras and has a magnetic centre falling inside a triangle drawn between the three points.

Further aspects of the first item are defined in the dependent claims and in the description given herein.

As a second item, there is provided a flatbed scanner comprising: a scanner body accommodating a transparent plate, for supporting a large format document; a lifting member attached to the flatbed document scanner body and carrying a document cover with an expanse covering at least a substantial area of the transparent plate; and a movable carriage configured to move below the rectangular transparent plate and carrying a camera or an optical system for a camera. The document cover comprises a flexible contact sheet carrying multiple weight members each having an expanse and position on the flexible contact sheet to collectively cover at least a substantial area of the transparent plate.

Thereby there is provided a gravitational load, by means of the weight members, acting on the large format document when resting on the transparent plate. The gravitational load provided by the document cover is not coupled rigidly to the lifting member, which may be a lid, by springs, foam or other types of springy or elastic means that could exercise a vertical load on a document resting on the transparent plate.

The total weight of the document cover and its flexibility may be balanced, in a trade-off, such that the gravitational load provided by the document cover acts on the apex of an upwardly curved fold, where a downwardly acting load is needed to exercise a local pressure where needed—without causing excessive deflection of the transparent plate. One criterion may be that the apex of a 'soft fold' of a newspaper page should touch the transparent plate, whereas a 'spine' of a newspaper is allowed to lift off from the transparent plate.

The substantial area of the rectangular transparent plate may correspond to a portion of the transparent plate excluding a peripheral portion thereof which is covered e.g. by paint to form an opaque peripheral band.

Suspension of the document cover may be dispensed with. Suspension may however be selected as a key-hole type; mushroom type; knee-joint suspension, wires, chains etc.

In some embodiments the multiple weight members have a weight per unit area that is significantly larger than a weight per unit area of the flexible contact sheet. The weight per unit area is the weight per unit area in a horizontal plane. A weight member, such as all of them, may have a weight that is more than 10 e.g. more than 20 times that of the weight of the flexible contact sheet. The weight members may comprise pockets or bags containing powder, spheres or other small particles or elements.

In some embodiments the weight members are plates. The plates may be substantially rectangular such that they can be arranged side-by-side with a clearance between them to collectively cover a substantial area of the rectangular transparent plate. The plates may have complementary finger joint cut-outs to avoid through-going straight channels between the plates.

The plates may be hinged together. The plates may have irregular, complementary shapes. The plates may be solid plates. In some aspects there are more than 4 plates. The plates may be iron plates or steel plates.

In some embodiments the multiple weight members count in the range of 200 to 800 plates per square meter arranged in a rectangular matrix structure. A plate may have an area of approximately 300 square millimeters, collectively weighing approximately 2 Kg and covering at least an A2 format document.

In some embodiments the total weight of the weight members is in the range of 2 to 8 Kg per square meter. Such a total weight of the weight members gives a good trade-off between straightening a typical document and keeping deflection of the transparent plate to a range within which the line camera, such as a Contact Image Sensor type line camera maintains focussed on the surface of the document to be scanned.

In some embodiments the plates are adhesively attached to the flexible contact sheet at a centre spot and are not glued to the flexible contact sheet at peripheral portions about the centre spot. The plates may be adhesively attached e.g. by means of glue or double-sided adhesive patches or tape.

In some embodiments the flatbed scanner comprises a top-sheet overlaying the plates and attached to an upper side of the flexible contact sheet at spots or lines between the plates. The top-sheet may be attached to the flexible contact sheet e.g. by spot welding or by a glue seam.

In some embodiments the flexible contact sheet is a white plastic sheet with a thickness in the range of 1-3 millimeters. In some aspects the plastic sheet is made from ABS, PS or PC. Such a flexible contact sheet has shown to provide adequate flexibility to transfer the gravity load from the weight members to the document without causing excessive deflection of the transparent plate.

In some embodiments the camera, arranged on the carriage, comprises multiple line cameras oriented in a transverse direction to a movement direction of the carriage and arranged along two parallel rows in a staggered configuration; and the line cameras are of the contact image sensor type.

Line cameras of the contact image sensor, CIS, type have a shallow depth of focus and flatbed scanners using such line cameras are particular prone to reproduce the original document electronically at degraded, blurred, image quality. In particular for flatbed scanners using such line cameras it is important keep the mechanical load exercised e.g. from the lifting mechanism, such as a lid, under accurate control.

In some embodiments the multiple weight members are magnetic; and wherein a stationary magnet system is attached to the movable carriage and configured to magnetically attract the weight members, through the flexible contact sheet, towards the movable carriage and thereby exert a significant pressing force acting on the physical document when supported on the rectangular transparent plate.

An advantage thereof is that the pressing force acting via the flexible contact sheet on the document, by magnetic attraction, to flatten the document acts at positions whereat the carriage currently is and where line reading operations are performed. At other locations, forwards and backwards of the moving direction of the carriage, the transparent plate is not exposed to deflection forces from the magnetic attraction. Thereby, deflection of the transparent plate can be kept within narrow tolerances.

In some embodiments the camera, arranged on the carriage, comprises multiple line cameras; and wherein the magnet system is configured with a magnetic flux density which, in a plane parallel to the rectangular transparent plate, is concentrated at positions next to the multiple line cameras. This may be achieved by arranging magnets such as permanent magnets or electromagnets next to the line cameras.

In some embodiments the weight members are upwardly decoupled from vertical downwards pressure from the lifting mechanism. Thus, the weight members are upwardly free to move at least within a predefined vertical excursion. The weight members act downwardly against the flexible contact sheet mainly by their gravitational load.

In some embodiments the document cover comprises upwardly extending suspension members configured with a head on a stem; and the lifting member is hinged to the scanner body and configured with holes for accepting the heads of the suspension members and allowing a movement of the stem, while retaining the head of the coupling member when an extreme position is reached.

In this way the lifting member can lift the document cover away from the document or the transparent plate in an open position and bring the document cover down to rest on the document or transparent plate in a closed position. In the closed position the movement of the stem gives the document cover some headroom to move while the lifting member itself is not pressing on the document cover. This greatly helps keeping deflection of the transparent plate within narrow tolerances while providing a user friendly operation.

In some embodiments the lifting member is configured with at least one keyhole of a first type with a slot that has a width equal to the diameter of a complementary stem plus a clearance; and at least one keyhole of a second type with a slot that has a resilient constriction for fixing the stem of a coupling member horizontally.

In some aspects, the lifting member is additionally configured with at least one keyhole of a third type with a slot that has a width equal to the diameter of a complementary stem plus a third clearance. The first clearance and the second clearance may be substantially equal and be configured to fit the stem, whereas the second clearance is wider to accommodate production tolerances in positioning of the stems etc. In some aspects the key hole of the first type and the key hole of the second type are arranged at diagonally opposing corners. Thereby the document cover can be held in place in an accurate orientation, while accommodation production tolerances without inducing twisting of the document cover.

In some embodiments the flatbed scanner is configured for supporting the full expanse of a large format document; wherein the transparent plate is supported on a frame with an upwardly facing plane face; and wherein the transparent plate overlies the upwardly facing plane face all around the frame; wherein the transparent plate and the frame are bonded together by a hard glue seam that forms a rigid bonding and runs on the upwardly facing plane face of the frame; and wherein the rectangular transparent plate is rigidly bonded to the frame by the hard glue seam to assume a predetermined deflected shape when turned upside-down and to deform with the rectangular metal frame under its own load to a cambered shape, a flat shape or a less deflected shape when turned upright in a normal position.

The frame elements of the frame are configured with mechanical strain, corresponding to a moment about longitudinal axes of the frame elements, wherein the mechanical strain is greater in a state wherein the transparent plate is relatively plane compared to a state wherein the transparent plate is supported to have a cambered, less plane, shape.

The mechanical strain is induced during manufacture, before the glue seam has hardened to form a rigid bonding, by pre-pending the transparent plate to assume a double-curved shape or by applying a twisting moment to the frame elements while the transparent plate has a predefined shape such as a plane shape. In some cases a combination of pre-pending the transparent plate and applying a twisting moment to the frame elements is applied. The moment may be a twisting moment. A twisting moment is also denoted torque.

The pre-pending of the plate may be induced by supporting or lifting the transparent plate at a centre portion while keeping the edges of the transparent plate at a fixed vertical level or by loading a centre portion of the transparent plate while it is turned upside-down and supported e.g. by the frame at or about its edges. The twisting moment is applied e.g. at a middle portion of a frame element or at several positions along the frame elements. The twisting moment may be applied to lateral frame elements, but not to end frame elements or to frame elements.

Thereby it is utilized that the transparent plate is kept in a relatively plane shape due to the induced strain in the structure comprising the transparent plate and the frame.

Thereby it is possible to achieve a cambered shape (upwardly curved), a flat shape or a less deflected (downwardly curved) shape which can be controlled to be within relatively narrow tolerances compared to the dimensions and rigidity of the frame. A requirement for an extremely stiff frame can be dispensed with. This is an important breakthrough inter alia because deflection of the transparent plate cannot simply be reduced, due to its own weight, by choosing a thicker transparent plate.

A first mechanical strain component, corresponding to a twisting moment about longitudinal axes of the frame elements, is induced before the transparent plate is attached to the frame or at least before the glue seam is hardened. In addition to the first strain, a second strain component caused by the weight of the transparent plate is present in the frame elements.

Thus, first torque acting on the frame elements, about their longitudinal axes, is induced before the transparent plate is attached to the frame or at least before the glue seam is hardened. Then, when the transparent plate is rigidly bonded to the frame second torque is induced in the frame elements by the weight of the transparent plate. The first torque and the second torque act in the same direction i.e. in a direction downwards within the frame.

Especially, it is possible to use a rigid frame, such as a metal frame like a steel frame, with reasonable dimensions. Since the glue seam is a hard glue seam there is established a rigid joint between the transparent plate and the frame, wherein mechanical tension in the transparent plate is transferred to the frame, which serves to limit, rather than prevent, deflection of the transparent plate. The mechanical tension occurs inter alia as twisting moments about a longitudinal axis of lateral elements forming the frame. The lateral elements may thereby assume a slightly turned position.

In some embodiments the rectangular transparent plate is selected from the group of:
  a glass plate with a thickness of about 3 millimeters and a rectangular size of about 42 to 55 centimeters by 60 to 75 centimeters,
  a glass plate with a thickness of about 4 millimeters and a rectangular size of about 59 to 70 centimeters by 84 to 100 centimeters,
  a glass plate with a thickness in the range of about 2.8 to 5 millimeters and a rectangular size larger than 42 centimeters by 60 centimeters.

Rectangular glass plates with such dimensions correspond to the glass plates used in large format document scanners of the flatbed type. In some embodiments the glass plate is a soda-lime float glass plate or a similar type of glass plate.

In some embodiments the rectangular transparent plate bonded to the metal frame by the hard gluing seam deflects less than 0.2 millimeters, such as 0.03 to 0.09 millimeters, at a centre position when turned upside-down and loaded by a 1 Kg load placed within a centre area being less than half the area of the transparent plate.

Further aspects of the second item are defined in the dependent claims and in the description given herein.

What is claimed is:

1. A flatbed scanner comprising:
  a scanner body accommodating a transparent plate for supporting a physical document;
  a document cover comprising a sheet member;
  a movable carriage extending across the transparent plate in a transverse direction and configured to move below the transparent plate in a longitudinal direction; wherein the movable carriage carries a camera with one or more line cameras oriented in the transverse direction; and
  a magnet system, attached to the movable carriage, and configured to magnetically attract the sheet member or one or more magnetic plates towards the movable carriage and thereby exert a significant pressing force acting on the physical document when supported on the transparent plate;
  wherein the carriage is upwardly supported at three points; and
  wherein the sheet member is magnetic or carries the one or more magnetic plates; and
  wherein the magnet system comprises one or more magnet arranged next to the one or more line cameras and has a magnetic center located inside a triangle drawn between the three points.

2. A flatbed scanner according to claim 1, wherein the magnet system is a stationary magnet system which is inflexibly attached to the carriage.

3. A flatbed scanner according to claim 1, wherein the camera, arranged on the carriage, comprises multiple line cameras; and wherein the magnet system is configured with a magnetic flux density which, in a plane parallel to the rectangular transparent plate, is concentrated at positions next to the multiple line cameras.

4. A flatbed scanner according to claim 1, wherein the camera, arranged on the carriage, comprises multiple line cameras; and wherein the magnet system comprises multiple magnets attached to the movable carriage at positions next to the multiple line cameras.

5. A flatbed scanner according to claim 1, wherein the carriage comprises a lateral base member; wherein the magnet system comprises multiple magnets attached to the movable carriage on respective vertical stays or spacers extending from the lateral base member; and wherein the magnets are arranged with their poles facing upwards or downwards.

6. A flatbed scanner according to claim 1, wherein the camera comprises multiple line cameras oriented in the transverse direction and arranged along two parallel rows in a staggered configuration.

7. A flatbed scanner according claim 1,
  wherein the camera, arranged on the carriage, comprises multiple line cameras oriented in the transverse direction and arranged along two parallel rows in a staggered configuration; and
  wherein the line cameras are of the contact image sensor type.

8. A flatbed scanner according to claim 1, wherein the magnetic plates have an expanse and position on the sheet member to collectively cover at least a substantial area of the transparent plate.

9. A flatbed scanner according to claim 1, wherein the magnetic plates are glued to the sheet member at a center spot and is not glued to the sheet member at peripheral portions about the center spot.

10. A flatbed scanner according to claim 1, wherein the magnetic plates are upwardly decoupled from any mechanically inflicted vertical pressure larger than their gravitational load.

11. A flatbed scanner according to claim 1, wherein the document cover comprises upwardly facing coupling members distributed across an upper side of the document cover; and wherein the flatbed scanner comprises a lifting member hinged to the flatbed document scanner body and configured with:
   a support face abutting the flatbed document scanner body or a periphery portion of the transparent plate when in a closed position; and
   downwardly facing complementary coupling means engaged with the coupling members;
      wherein the coupling members and the complementary coupling means has a mutual vertical clearance such that the lifting mechanism brings the document cover away from the transparent plate when in an open position and overlays the document cover on the transparent plate without the lifting member exerting force on the document cover when in a closed position.

12. A flatbed scanner according to claim 11, wherein the lifting member is configured with:
   at least one keyhole of a first type with a slot that has a width equal to the diameter of a complementary stem plus a first clearance; and
   at least one keyhole of a second type with a slot that has a width equal to the diameter of a complementary stem plus a second clearance and a resilient constriction for fixing the stem of a coupling member horizontally.

13. A flatbed scanner according to claim 1,
   wherein the document cover comprises upwardly extending suspension members configured with a head on a stem; and
   wherein the flatbed scanner comprises a lifting member hinged to the scanner body and configured with holes for accepting the heads of the coupling members and allowing a movement of the stem, while retaining the head of the coupling member when an extreme position is reached.

14. A flatbed scanner according to claim 1, wherein the magnet system comprises an electro-magnet.

15. A flatbed scanner according to claim 1, wherein the flatbed scanner is configured as an optical large format flatbed document scanner.

16. A flatbed scanner comprising:
   a scanner body accommodating a transparent plate for supporting a physical document;
   a document cover comprising a sheet member with an expanse covering the transparent plate or a document scanning area of the transparent plate; wherein the document cover has an underside;
   a movable carriage extending across the transparent plate in a transverse direction and configured to move below the transparent plate in a longitudinal direction; wherein the movable carriage carries a camera or an optical system for a camera;
   wherein the sheet member, of the document cover, is magnetic or carries one or more magnetic plates; and
   wherein a magnet system is attached to the movable carriage and configured to magnetically attract the sheet member or the one or more magnetic plates towards the movable carriage and thereby exert a significant pressing force acting on the physical document when supported on the transparent plate.

17. A flatbed scanner according to claim 16, wherein the sheet member is a flexible sheet member.

18. A flatbed scanner according to claim 16, wherein the sheet member carries multiple plate members each having an expanse and position on the sheet member to collectively cover the transparent plate or document scanning area of the transparent plate.

19. A flatbed scanner according to claim 16, wherein the multiple plate members have a weight per unit area that is significantly larger than a weight per unit area of the sheet member.

20. A flatbed scanner according to claim 16, comprising:
   a lifting member attached to the flatbed scanner body and carrying the document cover.

* * * * *